Aug. 7, 1945.  A. W. HALL  2,381,588
GROUND WORKING TOOL LIFT
Filed Sept. 14, 1943  2 Sheets-Sheet 1
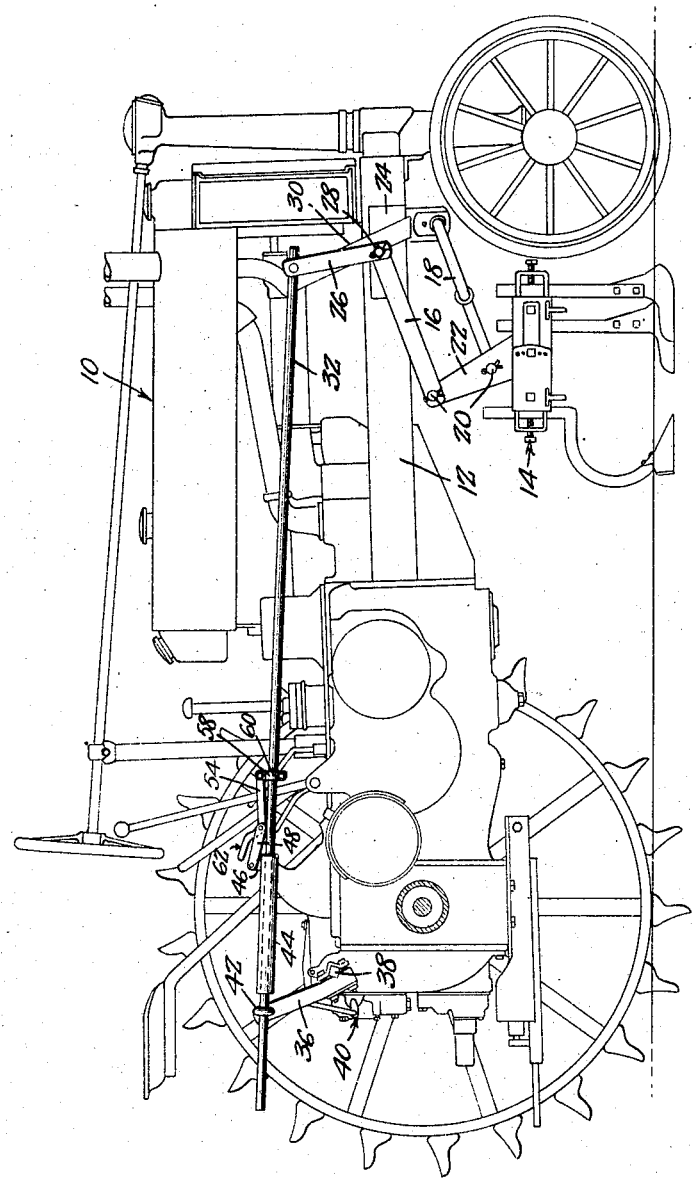
Asa W. Hall,
INVENTOR.
BY
*Victor J. Evans & Co.*
ATTORNEYS Aug. 7, 1945.　　　　　A. W. HALL　　　　　2,381,588
GROUND WORKING TOOL LIFT
Filed Sept. 14, 1943　　　2 Sheets-Sheet 2
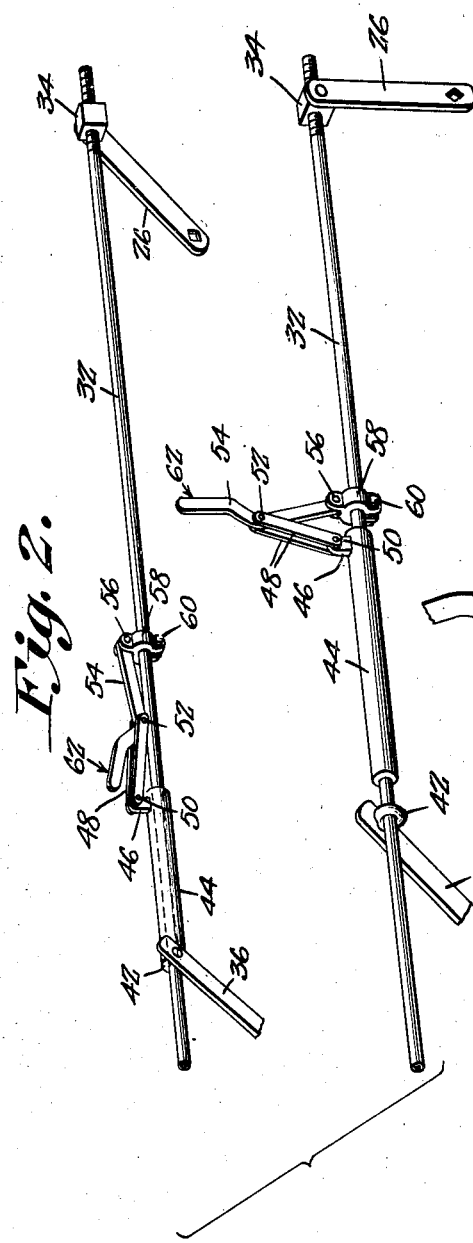
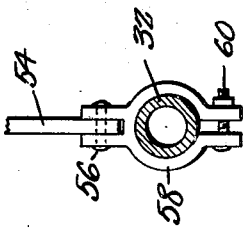
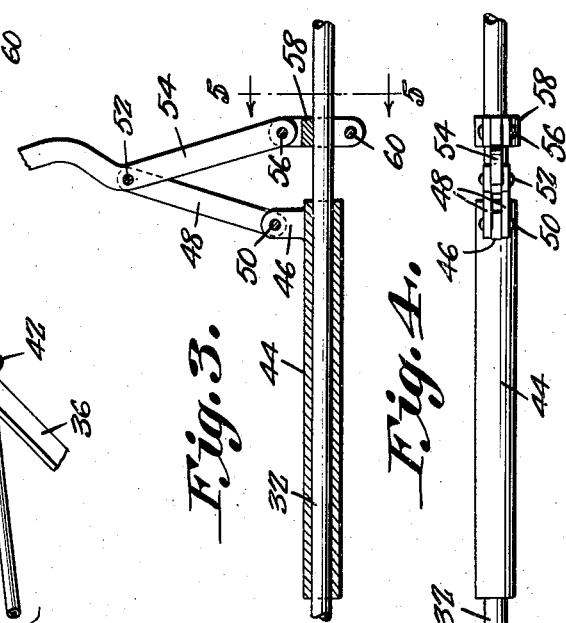
Asa W. Hall,
INVENTOR.
BY
Victor J. Evans & Co.
ATTORNEYS Patented Aug. 7, 1945

2,381,588

UNITED STATES PATENT OFFICE 2,381,588

GROUND WORKING TOOL LIFT

Asa W. Hall, Watseka, Ill.

Application September 14, 1943, Serial No. 502,337

5 Claims. (Cl. 97—50)

My invention relates to agricultural implements of the type wherein ground working tools are mounted on opposite sides of a tractor and adapted to be raised and lowered through the means of a hydraulic lift, and includes among its objects and advantages the provision of an improved lift control interposed in the hydraulic lift in such manner as to render the ground working tools on the opposite sides of the tractor independently operable with respect to raising and lowering thereof.

In the accompanying drawings:

Figure 1 is a side view of a tractor illustrating my invention applied thereto;

Figure 2 is a perspective view illustrating my invention in association with the ground working tool lifting bars on opposite sides of the tractor;

Figure 3 is an enlarged sectional view of the lift control;

Figure 4 is a top plan view of the structure of Figure 3; and

Figure 5 is a view taken along the line 5—5 of Figure 3.

In the embodiment selected for illustration, I make use of a tractor 10 having a frame 12 on which is mounted a tool frame 14. One such tool frame is mounted upon each side of the tractor so that the description of one unit will apply to both. Two parallel links 16 and 18 are associated with the tool frame, each being pivotally connected at 20 with an arm 22 of the tool frame and supported on a bracket 24 attached to the frame 12.

To the link 16 is secured an arm 26 pivotally mounted on a pin 28. This pin is supported in a member 30 secured to the bracket 24. To the upper end of the arm 26 is connected one end of a lifting rod 32 through the medium of a body 34 threadedly connected with the rod 32 and pivotally connected with the arm 26, as best illustrated in Figure 2. The opposite end of the lifting rod 32 is operatively connected with a lifting arm 36 attached to the work shaft 38 of a power lift mechanism 40. The lifting arm 36 is provided with an eye bolt 42 through which the rod 32 extends. The structure so far described is of the type illustrated in Patent No. 2,133,180, issued October 11, 1938.

My invention comprises a sleeve 44 slidably mounted on the lifting rod 32 and arranged to constitute an abutment for the eye bolt 42. Forward motion of the rod 32 imparts lifting motion to the tool frame 14 and the tool frame is held in an elevated position through engagement between the eye bolt 42 and one end of the sleeve 44, as in the uppermost rod 32 of Figure 2. To the end of the sleeve 44 opposite the eye bolt 42 is fixedly secured a lug 46 having two links 48 pivotally connected therewith, as at 50. The opposite ends of the links 48 are pivotally connected at 52 with a lever 54. One end of the lever 54 is pivotally connected at 56 with a collar 58 fixedly secured to the lifting rod 32 by a bolt 60. The pivotal connection 52 is located intermediate the ends of the lever 54 and the free end of the lever is offset at 62 to provide a grip.

In operation, Figure 2 illustrates the lever 54 on one of the lifting rods 32 pivoted to a position substantially paralleling that lifting rod, which locates the pivotal connection 52 closer to the lifting rod than the two pivotal connections 50 and 56, so that the sleeve 44 is locked against relative movement on the lifting rod with respect to pressure imparted thereto by the eye bolt 42. Thus clockwise rotation of the lifting arm 36 in Figure 1 imparts clockwise motion to the arm 26 for elevating one tool frame 14 only.

With both tool frames 14 in an elevated position, one tool frame may be lowered independently of the other by lifting the lever 54 to bring the pivotal connection 52 beyond the dead center line passing through the pivotal connections 50 and 56, as in the lowermost rod 32 in Figure 2. The tool frame associated with the lifting bar 32 will then drop notwithstanding the position of the lifting arm 36. With the lever 54 positioned against the lifting rod 32, the latter constitutes an abutment for the lever to restrain the latter from pivotal movement beyond the position illustrated.

My invention provides a simple and durable action which may be easily and quickly associated with a lifting rod of the type illustrated. Thus either tool frame may be lowered independently of the other to facilitate cultivation under conditions which require ground engagement with one tool unit only.

Without further elaboration, the foregoing will so fully illustrate my invention, that others may, by applying current knowledge, readily adapt the same for use under various conditions of service.

I claim:

1. In a device of the type described, the combination of a support having ground working tool means mounted thereon for vertical movement relatively to the support, a pivotal means for shifting said tool means, a rod movable longitudinally of itself and connected with said pivotal means to elevate said tool means, a power lift having an eye bolt slidably related to said rod, a sleeve slidable on and releasably fixed to said rod and engageable by said power lift means to move said sleeve with the power lift means, and pivotal means operatively connected with said sleeve and said member to latch and unlatch the sleeve with respect to said rod.

2. The invention described in claim 1 wherein said last-mentioned pivotal means comprises a lever having one end pivotally connected with said member, and a link having one end pivotally connected with said sleeve and its other end pivotally connected with said lever.

3. The invention described in claim 1 wherein said last-mentioned pivotal means comprises a lever having one end pivotally connected with said rod, and a link having one end pivotally connected with said sleeve and its other end pivotally connected with said lever, and in which said lever has abutting engagement with said rod when said sleeve is latched against sliding movement with respect to said rod.

4. The invention described in claim 1 wherein said sleeve is mounted loosely on said rod, a collar secured to said rod, a lever having one end pivotally connected with said collar, and link means having one end pivotally connected with the sleeve and its other end pivotally connected with said lever.

5. The invention described in claim 1 wherein said sleeve is mounted loosely on said rod, a collar secured to said rod, a lever having one end pivotally connected with said collar, and link means having one end pivotally connected with the sleeve and its other end pivotally connected with said lever, the axes of the pivotal connections between said link means and the sleeve, the link means and the lever and between the lever and said collar being so arranged as to bring the pivotal connection between the link means and the lever closer to said rod than the other axes in the sleeve latching position of the lever.

ASA W. HALL.